July 2, 1974  K. H. FISCHER  3,822,190
CALCINING OF CARBON SUBSTANCES AND CARBONACEOUS
ROCKS IN A TUNNEL KILN
Filed Oct. 11, 1967  4 Sheets-Sheet 1
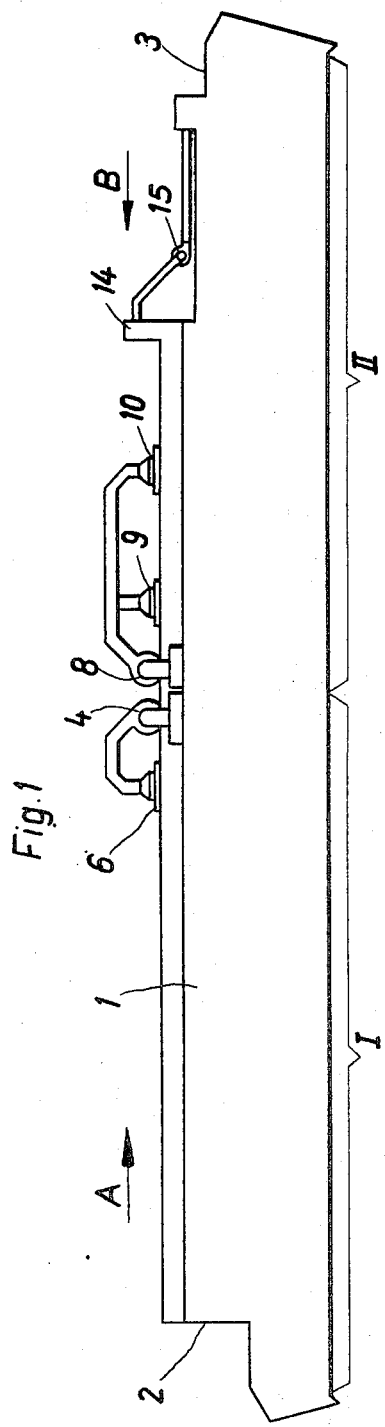
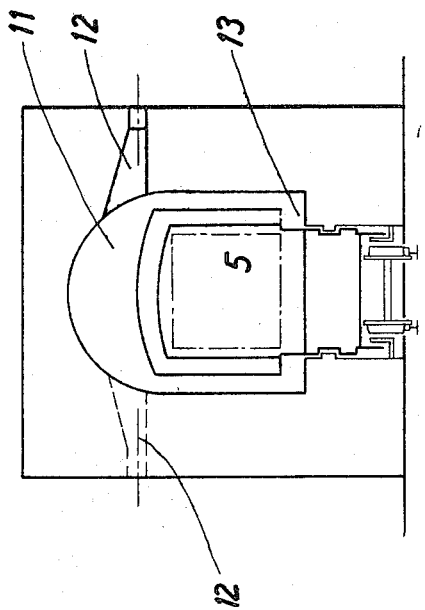
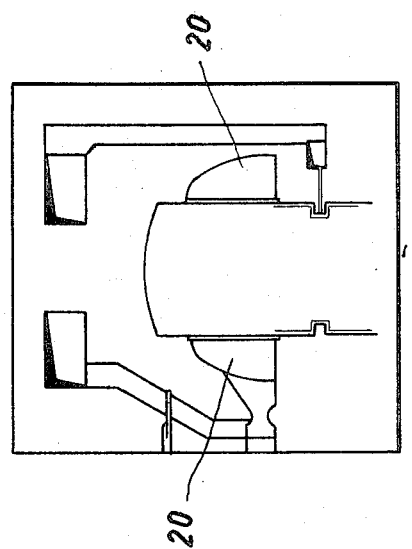
*Inventor:*
KARL HEINZ FISCHER
BY Paul & Paul
ATTORNEYS.

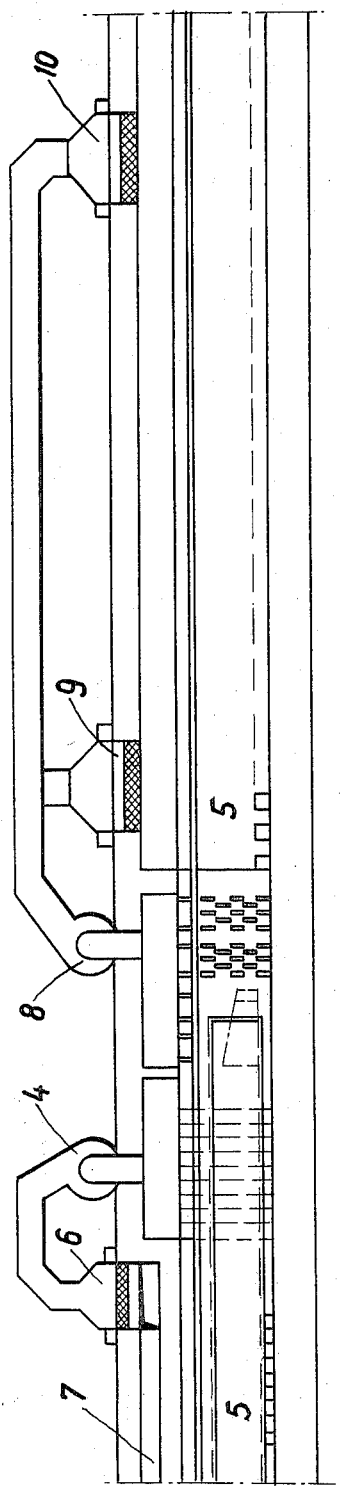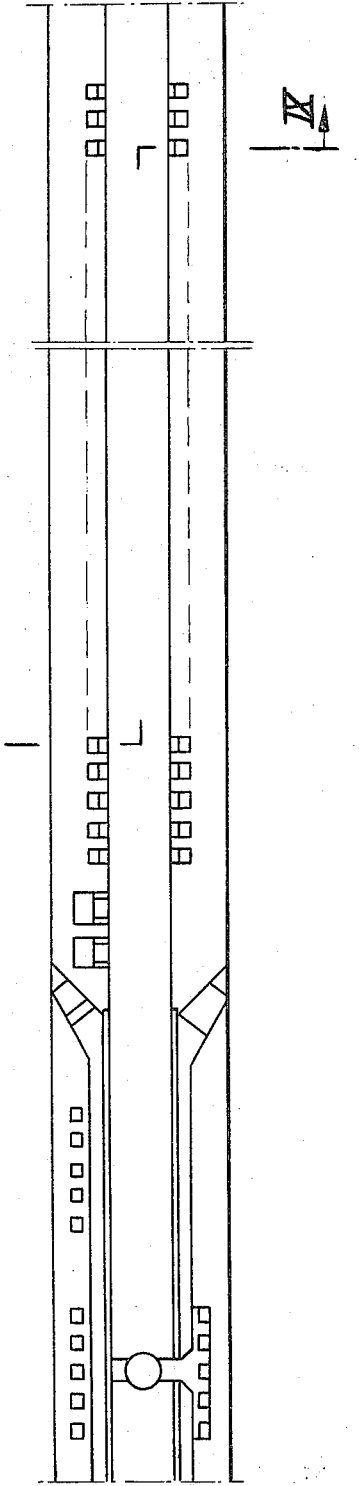

Inventor:
KARL HEINZ FISCHER

BY Paul & Paul
ATTORNEYS.

United States Patent Office 3,822,190
Patented July 2, 1974

3,822,190
CALCINING OF CARBON SUBSTANCES AND CARBONACEOUS ROCKS IN A TUNNEL KILN
Karl Heinz Fischer, Newunhof, near Kraftshof, Germany, assignor to Ludwig Riedhammer GmbH
Filed Oct. 11, 1967, Ser. No. 674,617
Claims priority, application Germany, Nov. 16, 1966, R 44,589
Int. Cl. C10b 47/20
U.S. Cl. 201—15                                 5 Claims

ABSTRACT OF THE DISCLOSURE

A method is provided for calcining carbon substances and carbonaceous rocks in a tunnel kiln wherein a substantially oxygen free atmosphere is maintained throughout the kiln while feeding an oxygen free scavenging gas under a slight excess pressure into the calcining channel, and withdrawing the gas and binding agent vapors from the channel in that region of the kiln where the largest amount of binding agent vapors occur.

---

In order to produce coal and graphite mouldings certain carbonaceous materials, for example, mineral coal, uncalcinated and calcinated cokes, anthracites or graphites, are admixed and moulded with binding agents, such as tar, pitch or synthetic resin, in a desired grain combination. In order to set them the castings are mostly calcinated in annular chamber-soaking pits or tunnel kilns, and are embedded in carbonaceous powder as protection against oxidation and deformation. During the heating of the castings considerable amounts of the admixed binding agents escape, which creates problems. The partial or complete combustion of the binding agents, which are produced as gases or vapours, is not controlled in the furnace and thus leads to undesired, rapid temperature increases in the calcining process and thus favours the destruction and cracking of the castings. In addition thereto, with the conventionally used mutually opposite flows of the flue gases and binding agents in the kiln, in a reducing or oxidizing atmosphere, the binding agents condense which results in tar formation and endangers the combustion operation and hence jeopardizes the process.

In all installations known to date the energy of the binding agents is not economically exploited. The binding agent vapours in admixture with the flue gases are cleaned with considerable technical difficulty. This is necesary, because, due to legal regulations, the oil and tar vapours may not be released into the atmosphere together with the flue gases.

It is an object of the invention to provide an improvement in calcining processes. Thus it is mainly the technical conception of this invention to provide a method for the continuous calcining of carbon substances and carbonaceous blocks, which makes it possible to control the binding agent vapours or gases and the exploitation of the same and which dispenses with the fume purifying plant for the binding agent vapours (tar vapours). In addition thereto, it is a further object of the invention to provide a tunnel kiln which is suitable for accomplishing the said method.

According to the invention the desired aim is achieved by feeding an oxygen free scavenging gas under a slight excess pressure into the calcining channel and by drawing off the same from the calcining channel particularly in that region of the kiln, where the largest amount of binding agent vapours occurs, together with the latter. Thereby it is advantageous to force the scavenging gas into the calcining channel partly from the inlet and partly from the outlet of the kiln and lead it to the extraction point. It is a particular advantage if the gas which is drawn off from the calcining channel is burned in catalysts in the tunnel kiln and if the thus obtained heated gas is partly used as scavenging gas and partly for heating the tunnel kiln. Furthermore, it is useful if the scavenging gas on the inlet side of the kiln which is used for feeding into the calcining chamber is fed into the calcining chamber at the full combustion temperature, that the gas has when leaving the catalyst whilst the scavening gas on the outlet side of the kiln used for feeding in is only fed into the calcining channel after the heat has been largely reduced in the gas coming from the catalyst.

The invention is not limited to the individual steps of the method, but also includes the application of the same. It is also contemplated that, in that region of the kiln where the largest amount of binding agent vapours occur, the gas in the calcining channel is drawn off together with the binding agent vapours and is burned in at least one catalyst and that the burned oxygen free heated gas is forced under a slight excess pressure to a section at the kiln inlet, into the calcining channel and is forced in the same direction as the combustion material, along the calcining channel and, after the heat is removed is led to another section at the kiln outlet into the calcining channel, in reverse direction to the combustion material and, if necessary, is supplied to a further section in order to heat the tunnel kiln.

A tunnel kiln which is particularly suitable for accomplishing the method according to the invention is characterised by the provision of at least one gas extraction device for the calcining channel in that region of the kiln zone, in which the largest amount of binding agent vapours occurs and, in that at least one catalyst and a device for forcing one part of the gas coming from the catalyst into the calcining channel, are provided at the kiln inlet, that further a heat exchanger is provided, through which a further part of the gas coming from the catalyst can be guided, that furthermore there is provided a device for forcing the gas coming from the heat exchanger into the calcining channel at the kiln outlet and that finally the tunnel kiln is provided with a conventional automatically closing door at the inlet and also at the outlet. It is a particular advantage if an extraction device with at least one catalyst is provided for the gas flowing from the inlet side to the extraction point and also for the gas flowing from the outlet side to the extraction point.

Since an oxygen-free atmosphere is established in the tunnel kiln undesired combustions of the binding agent vapours within the kiln can no longer occur. That part of the gas which comes from the catalyst and which has imparted its heat to the kiln and is led towards the chimney, is almost free of binding agent vapours, so that the flue gas purifying plant required to date to remove the binding agent vapours, can be dispensed with. In addition thereto the binding agent vapours are largely used for heating the tunnel kiln. In some cases the binding agent vapours suffice to cover completely the energy required for the combustion process. It is important that the scavenging gases from the inlet side should flow in the same direction as the combustion material but that the gases from the outlet side should flow in reverse direction to the combustion material and over the latter. When using the method according to the invention condensation of the binding agent vapours is largely prevented.

Since the scavenging gases are forced with their high temperature, which they have when leaving the catalyst, into the pre-heating zone, a relatively rapid heating of the combustion material is achieved there.

The combustion zone is also heated by the hot gas coming from the catalyst. If the heat content of these gases is not sufficient to cover the energy requirement at high temperatures, then additional burners are provided in the combustion chamber.

The oxygen free scavenging gases which are to be forced in at the kiln outlet are brought to the suitable temperature by a recuperator and flow over the combustion material, cool the same and lead the binding agent vapours, which might possibly still escape, to the catalyst. In addition thereto they serve as gas for protection against oxidation with certain combustion materials.

The invention is hereinafter explained with reference to the accompanying drawings, in which:

FIG. 1 is a side view of a tunnel kiln,

FIGS. 2, 3 and 4 are enlarged views of the kiln illustrated in FIG. 1,

FIGS. 5, 6 and 7 are enlarged plan views of the tunnel kiln according to FIGS. 1 to 4, FIG. 8 is a sectional view along the line VIII–VIII in FIG. 5.

FIG. 9 is a sectional view along the line IX—IX in FIG. 6.

Figure 2:
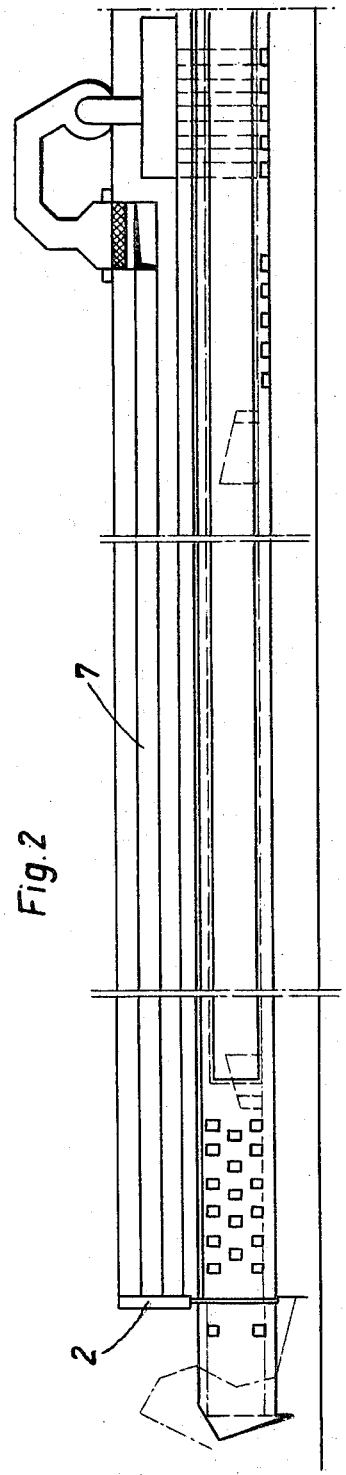
Figure 5:
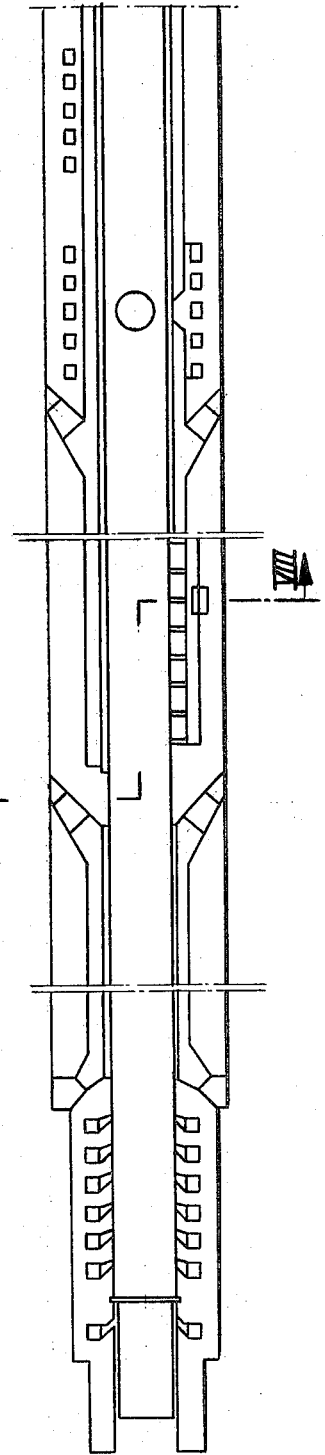
Figure 4:
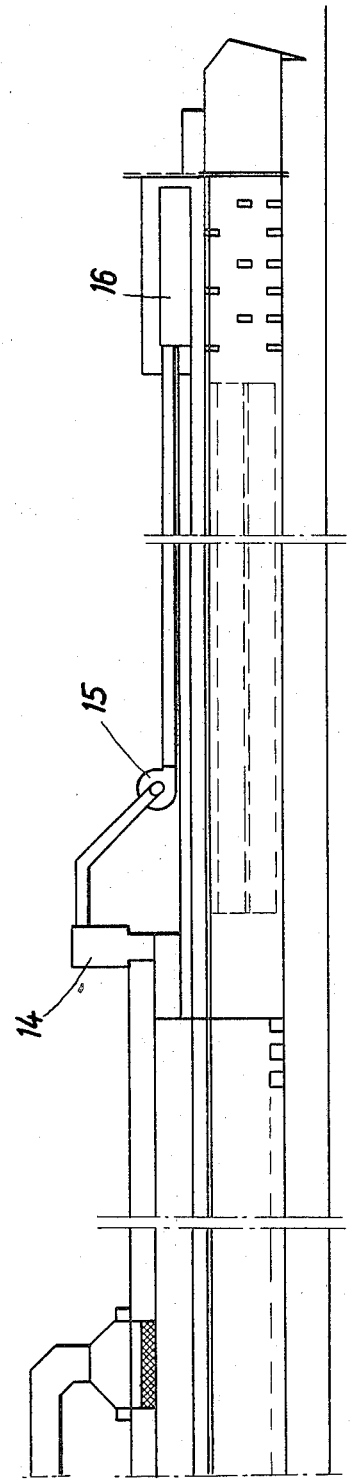
Figure 7:
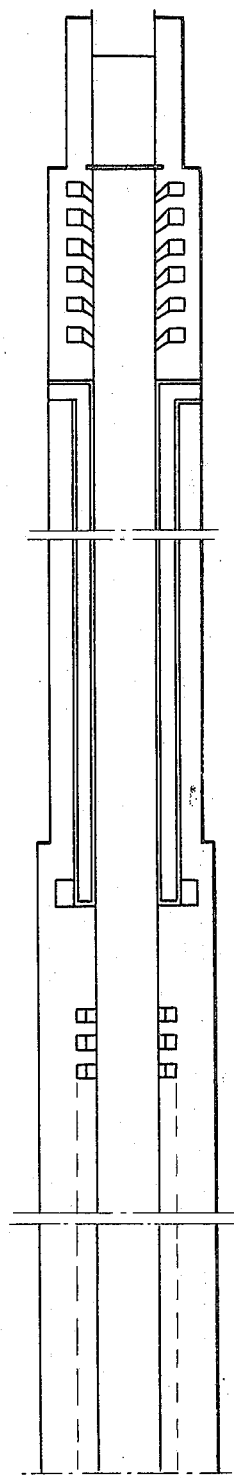

The inlet side of the tunnel kiln 1 is designated with 2 and the outlet side of the tunnel kiln is designated with 3. Carbon blocks which are to be burned, are put into non-illustrated wagons packed either freely or in powder-fill. The wagons are transported in direction of the arrow A through the tunnel kiln 1.

In the region where the largest amount of binding agents occur an extraction device 4 is provided by means of which the gas in the calcining channel 5 is extracted with the binding agent vapours. The said gas is led to the catalyst 6, where it is burned. One part of heated oxygen free gas flows through the upper channel 7 to the inlet 2 and is there forced with a slight excess pressure by scavenging gas into the calcining channel 5. It flows in direction of the arrow A through the calcining channel 5, and, in the pre-heating zone, it passes its heat to the calcining material and on its path to the extraction device 4 it takes up the binding agent vapours (tar).

The other part of the heated gas which comes from the catalyst 6 is forced into the muffle channels 20, where it radiates its heat over the muffle to the calcining material and thus leaves the furnace through the chimney.

At a small distance from the extraction device 4, there is located in the direction of feed of the combustion material, another extraction device, which is designated with 8. This device also serves to extract gas with the binding agent from the calcining channel 5. The gas extracted by this device is led to the catalyst 9 and to the other catalyst 10 which is separated slightly from the latter in the direction of feed of the combustion material. It burns in these catalysts. The gas leaving the catalysts 9 and 10 is partly led to a burning muffle 11 and here radiates its heat. The final temperature desired in this region is obtained, if necessary, by additional heat from the burners 12 is stoichiometrical combustion proportion. The gases of the burning muffle 11 enter the calcining channel 5 through the aperture 13.

A further part of the gas coming from the catalysts 9 and 10 is led to the heat exchanger 14 and then to the ventilator 155, where it is then forced by a slight pressure along the furnace outlet up to 16 and into the calcining channel 5 where it is forced in direction of the arrow B. The scavenging gas entering at 16 into the calcining channel 5 cools the combustion material and also takes up moves toward the extraction device 8, There are two scavenging gas circuits in the furnace, one of which, being designated with I, extends to the extraction device 4, and the other one, which is designated with II extends from the outlet 3 to the extraction device 8. In the scavenging gas circle I the scavenging gas flows in the same direction as the calcining material, whilst the scavenging gas in the scavenging gas circle II flows in the reverse direction to the calcining material.

The extraction devices 4 and 8 are located approximately at the beginning of the combustion zone.

The tunnel kiln has a conventional automatically closing door at the kiln inlet and also at the kiln outlet.

I claim:

1. Method for calcining carbon substances and carbonaceous rocks in a tunnel kiln which comprises maintaining an oxygen free atmosphere throughout said kiln, while feeding an oxygen free scavenging gas under a slight excess pressure into the calcining channel and withdrawing said gas together with binding agent vapours from the calcining channel, in that region of the kiln where the largest amount of binding agent vapours occur.

2. Method according to claim 1 in which the scavenging gas is forced into the calcining channel partly from the inlet and partly from the outlet and is led to withdrawing point.

3. Method according to claim 1 in which the gas which is withdrawn from the calcining channel is burned in the presence of catalysts to provide heat for heating the kiln and part of the scavenging gas.

4. Method according to claim 1 in which the scavenging gas on the inlet side of the kiln which is used for feeding into the calcining channel is fed into the calcining channel at the full combustion temperature, which the gas has when leaving the catalyst, whilst the scavenging gas on the outlet side of the kiln used for feeding in is only fed into the calcining channel after the heat has been largely removed therefrom.

5. Method for calcining carbon substances and carbonaceous rocks in a tunnel kiln in which in that region of the kiln where the largest amount of binding agent vapours occurs, the gas in the calcining channel is drawn off together with the binding agent vapours and is burned in the presence of a catalyst to produce a burned oxygen free, heated gas a first portion of which is forced under a slight excess pressure into the calcining channel at the kiln inlet and is forced in the same direction as the combustion material, along the calcining channel and a second portion of which is cooled and forced into the calcining channel at the kiln outlet and in the reverse direction to the combustion material, said process being characterized by the maintenance of a substantially oxygen-free atmosphere in said kiln.

References Cited
UNITED STATES PATENTS

| | | | |
|---|---|---|---|
| 2,269,025 | 1/1942 | Johansson | 201—32 |
| 3,009,863 | 11/1961 | Angevine | 201—32 X |

NORMAN YUDKOFF, Primary Examiner

D. EDWARDS, Assistant Examiner

U.S. Cl. X.R.

201—27, 29, 32, 36; 202—98; 264—29

UNITED STATES PATENT OFFICE
CERTIFICATE OF CORRECTION

Patent No. 3822190　　　　　　　　Dated July 2, 1974

Inventor(s) Karl Heinz Fischer

It is certified that error appears in the above-identified patent and that said Letters Patent are hereby corrected as shown below:

Column 2 line 8 change "scavening" to --scavenging--.

Column 3 line 62 change "155" to --15--.

Column 3 between lines 66 & 67 insert --some of the accumulated binding agent vapours as it--.

Column 4 line line 35 delete the 6th line of Claim 4 which reads-"some of the accumulated binding agent vapours as it".

Signed and sealed this 1st day of October 1974.

(SEAL)
Attest:

McCOY M. GIBSON JR.　　　　　　C. MARSHALL DANN
Attesting Officer　　　　　　　Commissioner of Patents